(12) United States Patent
Buchanan, Sr.

(10) Patent No.: US 6,935,379 B1
(45) Date of Patent: Aug. 30, 2005

(54) PREFABRICATED INSULATION FOR HVAC DUCTWORK AND OTHER FLUID CONDUITS

(76) Inventor: Marvin C. Buchanan, Sr., 1007 Gap Hill Rd., Six Mile, SC (US) 29682

( * ) Notice: Subject to any disclaimer, the term of this patent is extended or adjusted under 35 U.S.C. 154(b) by 0 days.

(21) Appl. No.: 10/713,506

(22) Filed: Nov. 14, 2003

Related U.S. Application Data

(63) Continuation-in-part of application No. 10/141,453, filed on May 8, 2002, now abandoned.

(51) Int. Cl.[7] .............................................. F16L 58/00
(52) U.S. Cl. ...................... 138/149; 138/156; 138/151; 138/167; 138/128; 428/40.1
(58) Field of Search ..................... 138/149, 110, 156, 138/151, 167, DIG. 1, 128; 428/40.1

(56) References Cited

U.S. PATENT DOCUMENTS

| | | | |
|---|---|---|---|
| 2,160,009 A | 5/1939 | Walker | 138/149 |
| 3,030,250 A | 4/1962 | Losse | 138/149 |
| 3,379,218 A | 4/1968 | Conde | 138/99 |
| 3,638,286 A | 2/1972 | Eichberg | 138/128 X |
| 3,818,949 A | 6/1974 | Johnson | 138/158 |
| 3,858,282 A | 1/1975 | Plummer | 138/168 X |
| 3,925,856 A | 12/1975 | Plummer, III | 138/168 X |
| 4,022,248 A * | 5/1977 | Hepner et al. | 138/141 |
| 4,197,880 A | 4/1980 | Cordia | 138/99 |
| 4,413,656 A | 11/1983 | Pithouse | 138/110 |
| 4,442,153 A | 4/1984 | Meltsch | 138/156 X |
| 4,532,168 A | 7/1985 | Steele et al. | 138/166 X |
| 4,576,846 A | 3/1986 | Noel | 138/128 X |
| 4,584,217 A * | 4/1986 | McClintock | 428/41.8 |
| 4,605,043 A | 8/1986 | Grenier | 138/149 |
| 4,606,957 A * | 8/1986 | Cohen | 428/40.9 |
| 4,842,908 A * | 6/1989 | Cohen et al. | 428/34.2 |
| 4,874,648 A | 10/1989 | Hill et al. | 138/110 X |
| 4,996,088 A * | 2/1991 | Knittel et al. | 428/40.9 |
| 5,104,701 A | 4/1992 | Cohen et al. | 138/149 X |
| 5,112,661 A | 5/1992 | Pendergraft et al. | 138/149 X |
| 5,123,453 A * | 6/1992 | Robbins | 138/149 |
| 5,143,574 A * | 9/1992 | Knittel et al. | 156/307.5 |
| 5,421,371 A * | 6/1995 | Lauer | 138/110 |
| 5,605,593 A * | 2/1997 | Lauer | 156/230 |

(Continued)

FOREIGN PATENT DOCUMENTS

EP   254849 A   2/1988

*Primary Examiner*—Patrick Brinson
(74) *Attorney, Agent, or Firm*—Leatherwood Walker Todd & Mann, P.C.; Thomas W. Epting

(57) ABSTRACT

An improved insulation and an improved method for preparing and installing sheets of insulation having a vapor-barrier jacket or "finish" to ductwork and other fluid conduits or other surfaces. Anchor tabs are provided on the insulation, as are also studs for anchorage and mechanical attachment. Pressure sensitive tape with a split release strip is applied to the sheets prior to the installation of the sheets to the ductwork or other fluid conduits. The pressure sensitive tape is for sealing of any penetrations in the vapor-barrier by the mechanical attachment devices and for sealing of the edge of the vapor barrier jacket flange to the adjacent piece vapor-barrier jacket. The insulation is configured such that during storage and shipment, the jacket attachment flanges are positioned to avoid crumpling.

16 Claims, 10 Drawing Sheets

U.S. PATENT DOCUMENTS

| | | | |
|---|---|---|---|
| 5,736,211 A | 4/1998 | Fontanilla | 138/140 X |
| 5,869,159 A | 2/1999 | Padilla | 138/139 |
| 5,960,602 A | 10/1999 | Goss et al. | 52/404.4 |
| 5,964,252 A * | 10/1999 | Simmons et al. | 138/149 |
| 6,000,420 A | 12/1999 | Nicholson et al. | 137/15 |
| 6,460,576 B2 * | 10/2002 | Vitoorapakorn | 138/149 |
| 6,755,218 B2 * | 6/2004 | Whitty | 138/149 |

* cited by examiner

PREFABRICATED INSULATION FOR HVAC DUCTWORK AND OTHER FLUID CONDUITS

This application is a continuation-in-part of application Ser. No. 10/141,453, filed May 8, 2002 now abandoned.

BACKGROUND OF THE INVENTION

This invention relates generally to thermal insulation, and more specifically to fibrous blanket duct insulation or other forms and applications of insulation with vapor-barrier jackets.

Fibrous blankets, also known as duct wrap, with vapor-barrier/finish jackets are one of the most widely used materials in the insulation of heating, air conditioning, and other conduits in buildings and industry. Standard fibrous blankets are packaged in rolls of 50 foot, 75 foot, or 100 foot lengths. The insulation width is typically 48 inches, and the jacket width is 50 inches, which includes the 2-inch wide jacket attachment-flange. Other widths or lengths may be available. The insulation is available in various thickness and densities. It is faced with a laminated jacket of foil, fiberglass strand reinforcement, and kraft paper or other membranes or films, and the jacket has a continuous two-inch attachment-flange that extends two inches beyond the insulation material. The rolls of insulation are compression rolled and bound with strips of material adhered around the roll. The rolls are placed in plastic bags with the bag closed by binders. The two-inch jacket attachment-flange that extends from the edge of the insulation may become crumpled or pressed down in contact with the end of the roll of insulation.

A common procedure for installing insulation includes the insulation being transported to a job site in rolls where it is cut to length, piece by piece, as it is installed. Each roll of material is equipped with one two-inch wide jacket attachment flange along the longitudinal length of the roll. One workman rolls out the material and makes cuts of the material on the floor near where the system to be insulated is located. The workman usually gets in a kneeling position, or down on hands and knees, as it is otherwise difficult to reach completely across the 4-foot width. Measurement is made for the length to be cut on both edges of the material after it is unrolled onto the floor, and a straight edge is placed on the marks, and the cut is made with a knife. The straight edge is moved in two inches from the end and another cut is made through insulation material, being careful to cut only through the insulation but not through the jacketing. The fibrous insulation is then pulled from the jacket on the two-inch width piece leaving a jacketing attachment-flange without insulation. Each piece now has one factory or shop-provided two-inch wide jacket attachment flange and one field cut two-inch wide jacket attachment flange.

The workman next gets up from the floor and deliver the cut piece to the installing workman. This is repeated for each piece required. This job-site cutting method is very time consuming and strenuous, subjecting the workman to the possibility of strains and sprains as well as exposing the workmen and other job site personnel to airborne fibers. These fibers may be both an epidermal irritant and a respiratory hazard. On some larger construction projects, such as hospitals, the insulation of ductwork may take many months to complete.

The applicator places the cut piece around the duct, and the opposite longitudinal ends are pulled together, overlapping the flange from one end over the opposite end. The orientation of the piece during application results in the factory or shop jacket attachment flange being in an installed circumferential position in relation to the duct, and the cut end jacket attachment-flange being installed in a longitudinal position in relation to the duct. The flange is then stapled to the jacket of the opposite end with a flare-type staple.

Failure of the flare-door-type staple guns is common, and since many job sites are in remote locations, the failure of the staple gun delays work and increases costs. Stapling provides mechanical attachment, and the insulation is actually held in place on the duct by the staples and by any adhesive bonding provided by the tape.

Typically, for rectangular or square ducts having a width of over 24 inches, insulation anchors may be installed prior to installing the insulation. The anchors may be installed on the surface of the bottom of the duct or as required to hold the insulation tight to the surface. These anchors are load bearing and prevent the insulation sagging down from the bottom of the duct.

When pieces are being installed on large duct, two applicators may be required, one to hold the first end of the piece in place on the duct and the other to wrap the material around the duct and to attach the overlapped ends with staples. The two-inch jacket attachment-flange on one side of the circumferential length of the installed piece may require straightening or smoothing and may be even folded under the insulation. As successive pieces are installed, after the two-inch jacket attachment-flange on the circumferential length is straightened and smoothed, it is overlapped onto the adjacent installed piece and is stapled in place.

After stapling is completed, the applicator cuts pieces of pressure sensitive tape with release strip from a tape roll. The tape is of similar type as the insulation jacket material. The applicator next peels a section of the release strip from the end of the cut piece of tape. Many times starting the peel of the release strip can be difficult and take time. The applicator next adheres the end of the cut piece of tape over the insulation jacket attachment flange edge. The remaining release strip is removed as the length of the tape is applied over the length of the staples and flange edge. The tape is then rubbed with a squeegee or other smooth object to insure complete seal of all joints.

Cutting and applying tape takes considerable time, as access may be difficult and require stooping and reaching, as most applications are accomplished from ladders or scaffolds. Also, removal and management of release strips takes time. Care must be taken to make sure that every joint both circumferential and longitudinal is sealed completely.

If the joints are not completely sealed on the insulation jacketing installed on duct (such as air conditioning duct, which operates at a temperature lower than ambient temperature), moisture may enter the insulation, making the insulation wet and ineffective. This results in condensation drips that damage ceilings and interiors of buildings. Molds may result from this wet insulation and wet surfaces, resulting in damage and an indoor air pollution problem.

The technique for installing insulation on heating, air-conditioning, and ventilation ductwork and other fluid conduit has changed minimally over the last 30 to 40 years. Prior to that time, suitable pressure-sensitive tape was not available, and a liquid adhesive was brush applied under the overlap jacket flanges or a mastic coating, with or without reinforcement, was used over all joints to achieve a seal.

Attachment tabs are commonly used on several types of insulation covers today. They are usually fabric or rope type tabs or straps and are common on fabric encased removable and reusable pipe valve, flange and fitting covers. Many are equipped with Velcro fasteners.

SUMMARY OF THE INVENTION

The present includes an improved method for anchoring, mechanically attaching, and sealing jacket flanges on jacketed fibrous blanket duct insulation, using sheets of insulation with anchor tabs, mechanical attachment studs, an integral first pressure sensitive tape portion having a release liner, and a integral second pressure sensitive tape portion having a release liner.

The present invention also includes an improved method of preparation of jacketed fibrous blanket duct insulation for shipment by providing that the jacket flange is folded back onto the jacket of the insulation.

More specifically, the present invention includes an improved insulation and to an improved method for preparing and installing sheets of insulation having a vapor-barrier jacket or "finish" to ductwork and other fluid conduits or other surfaces, by applying anchor tabs, studs for anchorage and mechanical attachment, and a pressure sensitive tape with a split release strip applied to the sheets prior to the installation of the sheets to the ductwork or other fluid conduits. The pressure sensitive tape is for sealing of any penetrations in the vapor-barrier by the mechanical attachment devices and for sealing of the edge of the vapor barrier jacket flange to the adjacent piece vapor-barrier jacket.

Accordingly, one embodiment of the present invention provides anchor tabs of jacket material with pressure sensitive adhesive. Upon positioning of the piece of insulation material onto the duct the release strips are removed from the anchor tabs, and the pressure sensitive adhesive is bonded onto the surface of the duct. This provides an adequate anchor for the end, enabling the applicator to easily wrap the piece around the duct.

Another embodiment of the present invention is an array of sheet metal studs connected together on a common foot portion with the common foot portion placed on the underside of the sheet of insulation with the studs positioned at a 90 degree angle to the foot portion and protruding through the insulation sheet and the vapor-barrier jacket, and being equipped with pressure sensitive adhesive on the bottom of the foot portion for anchoring the studs to the duct surface.

When the insulation sheet with vapor-barrier jacket is installed around the duct and pulled snug against the opposite anchored end, and the studs are impaled through the jacket attachment flange and folded, both ends of the piece will be anchored together and are anchored to the duct. The attachment flange on the end of the wrapped piece is then pressed over the studs and the studs bent and pressed down onto the attachment flange, thereby providing mechanical attachment for the two opposing ends of the piece.

Another embodiment of the present invention is the pre-installed pressure sensitive tape with a split release strip which provides a greatly improved method of sealing of any penetrations in the vapor-barrier facing material by mechanical attachment devices and for sealing of the edge of the vapor barrier jacket flange to the adjacent piece vapor-barrier jacket.

The tape may be installed onto jacketed insulation prior to the jacket being installed on the insulation or prior to the insulation with jacket being installed on duct or other conduit or surface. When tape is applied to the insulation, the insulation material may be in various dimensions including, continuous or long lengths, and the jacket material may be in rolls of 1000 lineal feet or more, or other dimensions. The pressure sensitive tape with a split release strip may be applied to the jacket prior to the time that the jacket is laminated with the insulation. It also may be installed at the time the insulation and jacket is run simultaneously through a machine or other application process. It may further be installed when the faced material is wound into a roll, or installed when pieces are cut from a roll or processed into other forms and cut to length. The vapor-barrier jacket flanges may be folded back on to the facing of the insulation.

Installation of the tape is accomplished by bonding the split release strip tape onto and in a parallel position to the vapor barrier jacket flange. The tape is applied so that the edge position of the tape preferably extends a minimum of one half inch beyond the edge of the jacket-flange. This is accomplished by removing the split release liner from one side of the tape, adhering the exposed adhesive on that side of the tape to the vapor barrier jacket in a parallel position with the jacket flange. The adhered position allows at least one half inch of the jacket attachment flange to be exposed for installation of mechanical attachment devices including studs or staples. The tape is not to be adhered to that one half inch strip of the jacket attachment flange and extends at least an additional one half inch beyond the edge of the jacket attachment flange edge. The release strip remains in place on the unbonded section of the tape.

The tape is preferably a minimum width of one and one half inches, to provide adequate surface bonding to the jacket flange, (preferably a minimum one half inch), and continuing over the staples, (preferably a minimum of one half inch), and continuing over the edge of the jacket flange, (preferably a minimum of one half inch). In one preferred embodiment, a three-inch wide tape is used with one inch bonded to the jacket attachment flange, and with two inches of the tape unbonded and having the release strip in place. The three-inch size allows one inch for the application of staples through the jacket attachment flange and an additional one-inch for bonding to the jacket of the adjacent piece. Also, the tape provides a strong grip point on the jacket attachment flange for pulling the cut piece of insulation snug to the adjacent end or piece.

During field application, the cut piece of jacketed insulation is placed around the duct, and the end of the piece with the anchor tabs and studs is secured to the duct surface. The opposite end of the piece is next pulled around the duct. The jacket attachment flange is impaled over the studs. The studs are then folded over creating a mechanical attachment of the two ends as well as anchoring the two ends to the surface of the duct. The release strip is then removed from the pressure sensitive tape and the tape is sealed over the studs, the edge of the jacket flange and onto the opposite end jacket.

Next, the circumferential joint folded jacket flange is unfolded onto the adjacent piece of installed insulation with jacket. The stapling flange with tape is gripped and the insulation is pulled snug against the adjacent installed piece. The tape with the release strip is raised to gain access of a staple gun for installation of flare type staples in the outer one half inch of the jacket flange, and staples are then installed. Next, the non-adhered section of the tape with the release strip intact is pulled tightly over the staples and jacket stapling flange edge and onto the jacket of the adjacent installed piece of insulation. The release strip is then removed, and the tape adheres over the staples, the edge of the jacket flange and onto the jacket of the adjacent installed piece of insulation. The tape is then rubbed briskly with a squeegee to insure complete seal.

In real job applications today it is very easy to omit installing tape completely over staples and on all joints in the jacket in order to form a complete seal vapor seal. If seal is not complete, moisture from the ambient air will enter the insulation resulting is loss of efficiency, higher energy usage and possible water damage to the building. With the tape being pre-applied it will be easier to insure complete coverage.

It is hoped that the present invention will improve insulation installation, both by reducing costs and increasing the quality of installation.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
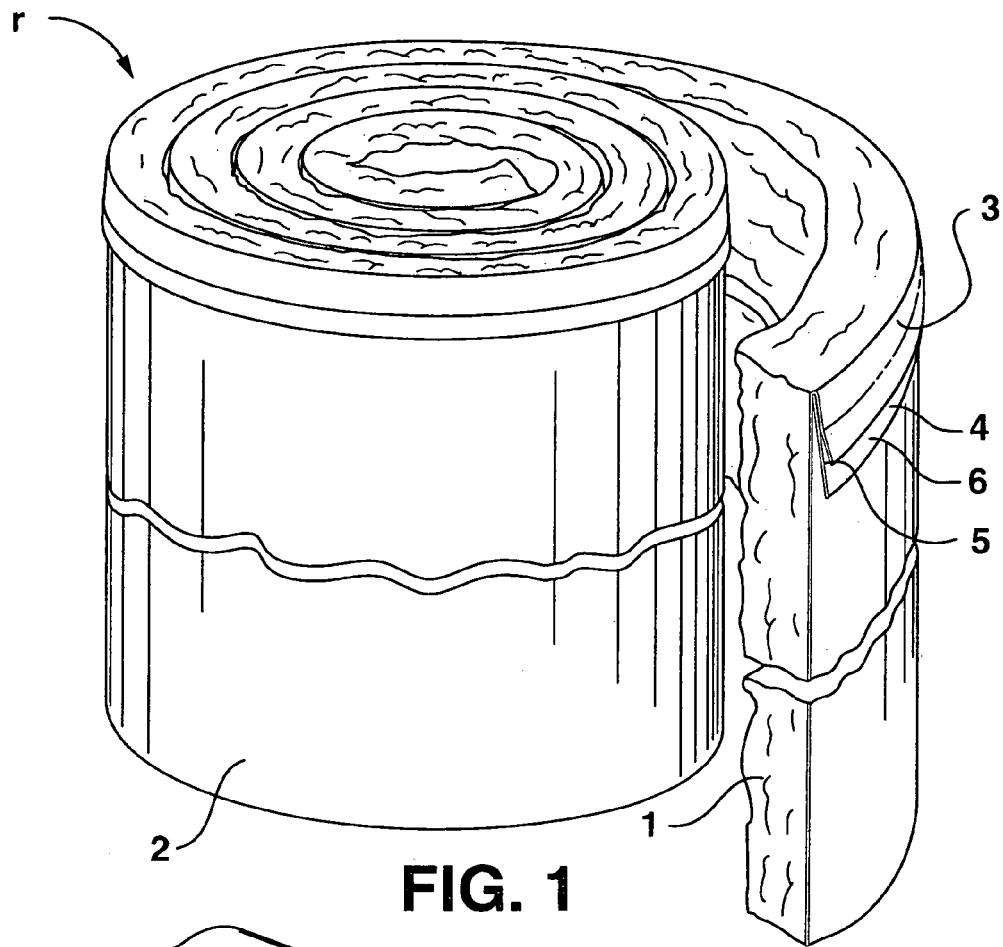
FIG. 1 is a partial perspective view of a roll of flexible fibrous blanket duct insulation constructed in accordance with the present invention with a jacket, with tape consisting of an adhesive strip with split release liner strips, and wherein a jacket attachment flange is folded back onto the jacket of the insulation for handling and shipment.

The accompanying drawings and the description which follows set forth this invention in its preferred embodiment. However, it is contemplated that persons generally familiar with insulation will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, a preferred embodiment of insulation constructed in accordance with the present invention is indicated generally in the figures by reference character 1.

The entirety of my earlier patent application Ser. No. 10/141,453, filed May 8, 2002, is hereby incorporated by referenced thereto.

As shown in FIG. 1, a preferred embodiment of the present invention includes insulation material 1 having a jacket 2. Insulation 1 is shown in roll form for transport, although it is to be understood that insulation could also be transported in sheet form. A jacket attachment-flange 3 is provided and is folded back upon the jacket 2 of the insulation. The folded position is an improvement over the prior art, wherein the attachment flange is in an up position that may result in the jacket flange being crumpled and sometimes folded inward, thereby resulting in time consuming difficulties during installation. Pressure-sensitive adhesive tape 4 (having one split release liner strip 6a removed) is bonded to the outside of the jacket attachment-flange 3, and one release liner strip 6 is intact.

Figure 2:
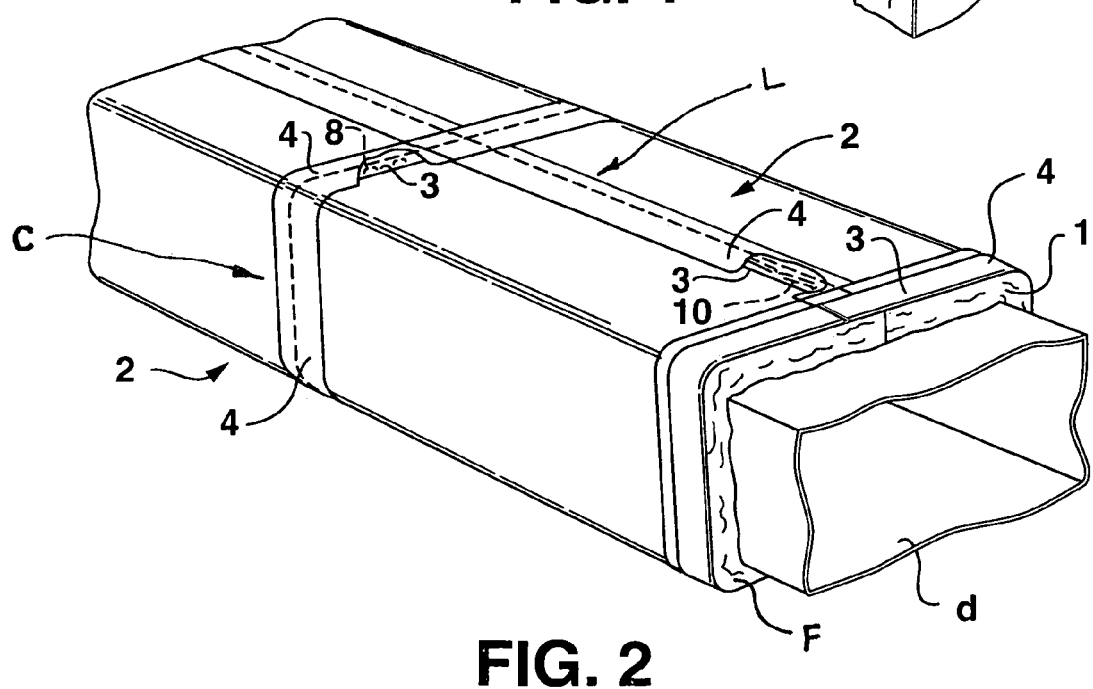
FIG. 2 is a perspective view of an air conditioning duct with two pieces of flexible fibrous blanket insulation constructed in accordance with the present invention, having a jacket installed over the section of duct.

As shown in FIG. 2, two adjoining pieces of flexible fibrous blanket insulation 1, with jacket 2, and with a jacket attachment flanges 3, is shown on a section of duct D. The circumferential joint C is shown with insulation tightly abutted with jacket attachment flange 3 and secured by staples 8, and sealed with pressure-sensitive adhesive tape 4.

The longitudinal joint L is shown with ends insulation 1 tightly abutted with jacket attachment flange 3 and secured by prongs 10 and sealed with pressure-sensitive adhesive tape 3. The forward end F of insulation 1 is shown with the jacket attachment flange 3 and the pressure sensitive adhesive tape 4, with adhesive release strip 6 having been folded back onto the jacket 2 of the insulation 1 in a position to allow a successive piece of insulation 1 to be installed on the duct d.

Figure 3A:
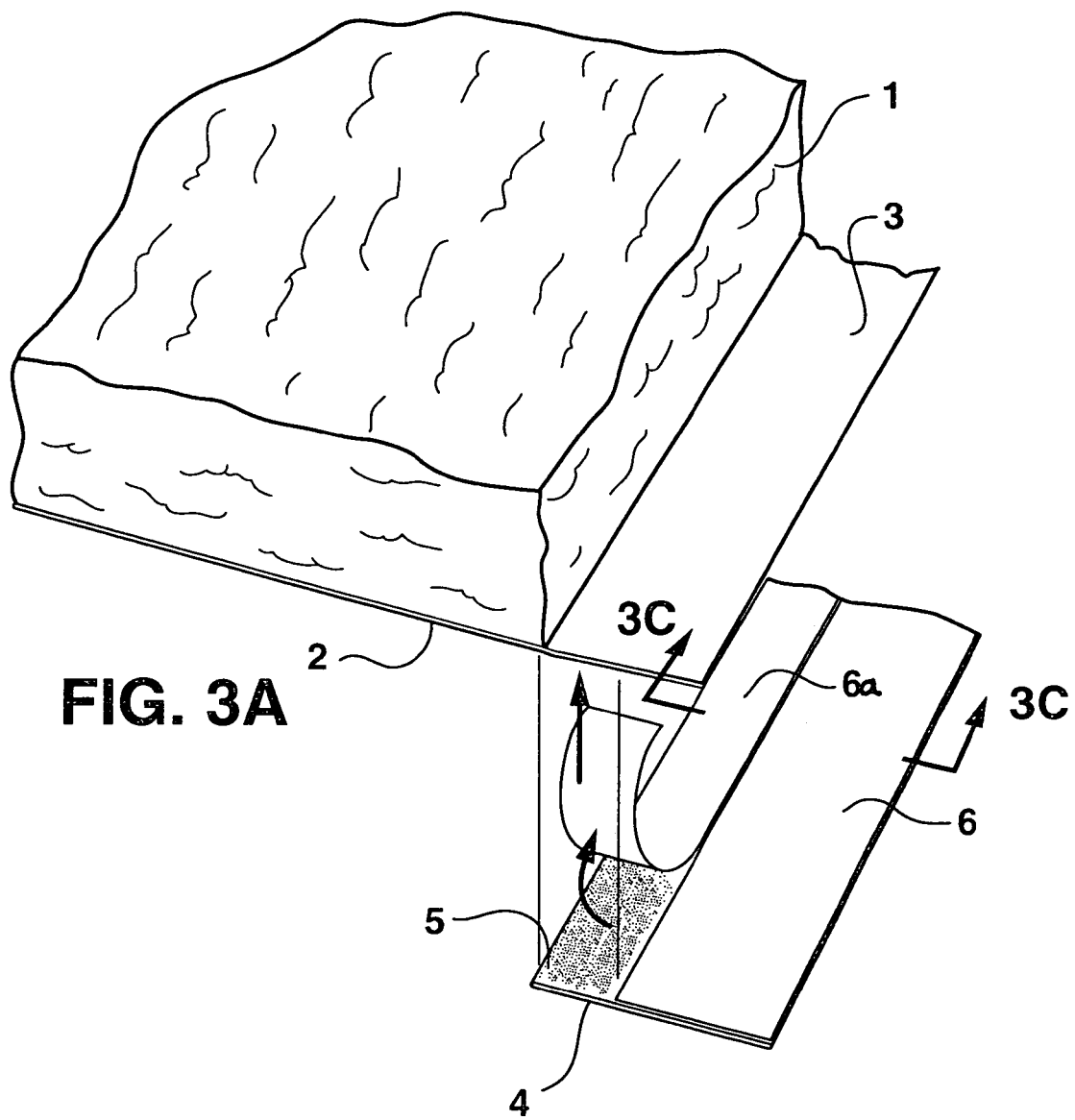
FIG. 3A is an exploded view of insulation constructed in accordance with the present invention, cut from an unrolled end of fibrous blanket duct insulation with a jacket and with a jacket attachment flange on an end, and with tape with split release liner strips positioned for placement onto jacket attachment flange.

As shown in FIG. 3A, one step in the prefabrication process is when pressure-sensitive adhesive tape 4 with adhesive strip 5, and with split release liner having one strip 6a partly removed, is ready to be bonded to the jacket attachment flange 3.

Figure 3B:
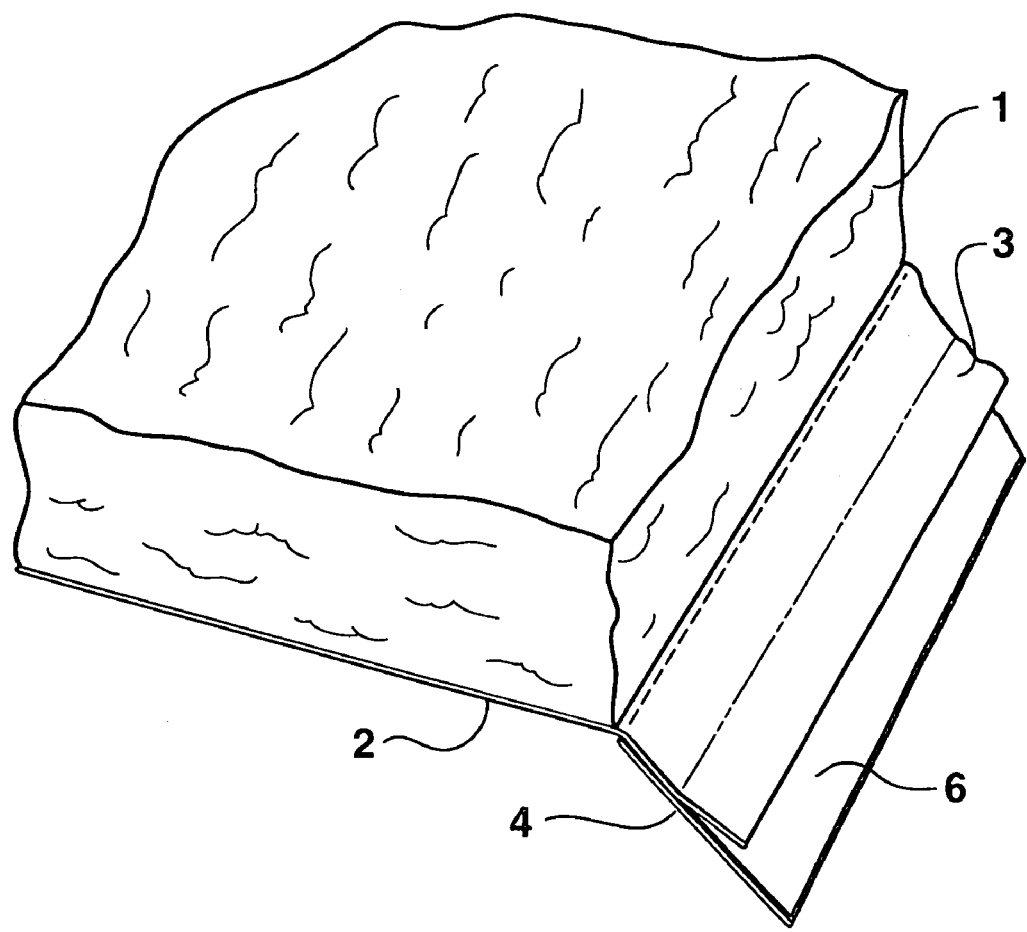
FIG. 3B is an exploded view of insulation constructed in accordance with the present invention, cut from an unrolled end of fibrous blanket duct insulation with a jacket and with a jacket attachment flange on an end and with tape with split release liner strips, and illustrating securing the tape with split release liner strips to the jacket attachment flange.

As shown in FIG. 3B, pressure sensitive adhesive tape 4 of similar material as jacket 2 of the flexible fibrous insulation material 1 is shown bonded to the jacket attachment flange 3.

Figure 3C:
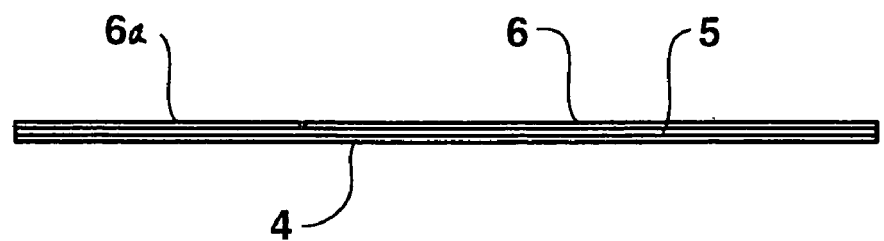
FIG. 3C is a cross sectional view of tape constructed in accordance with the present invention having split release liner strips.

FIG. 3C illustrates an end view of the pressure sensitive tape 4 with adhesive 5 and with release strip split into two sections 6a, 6.

Figure 4A:
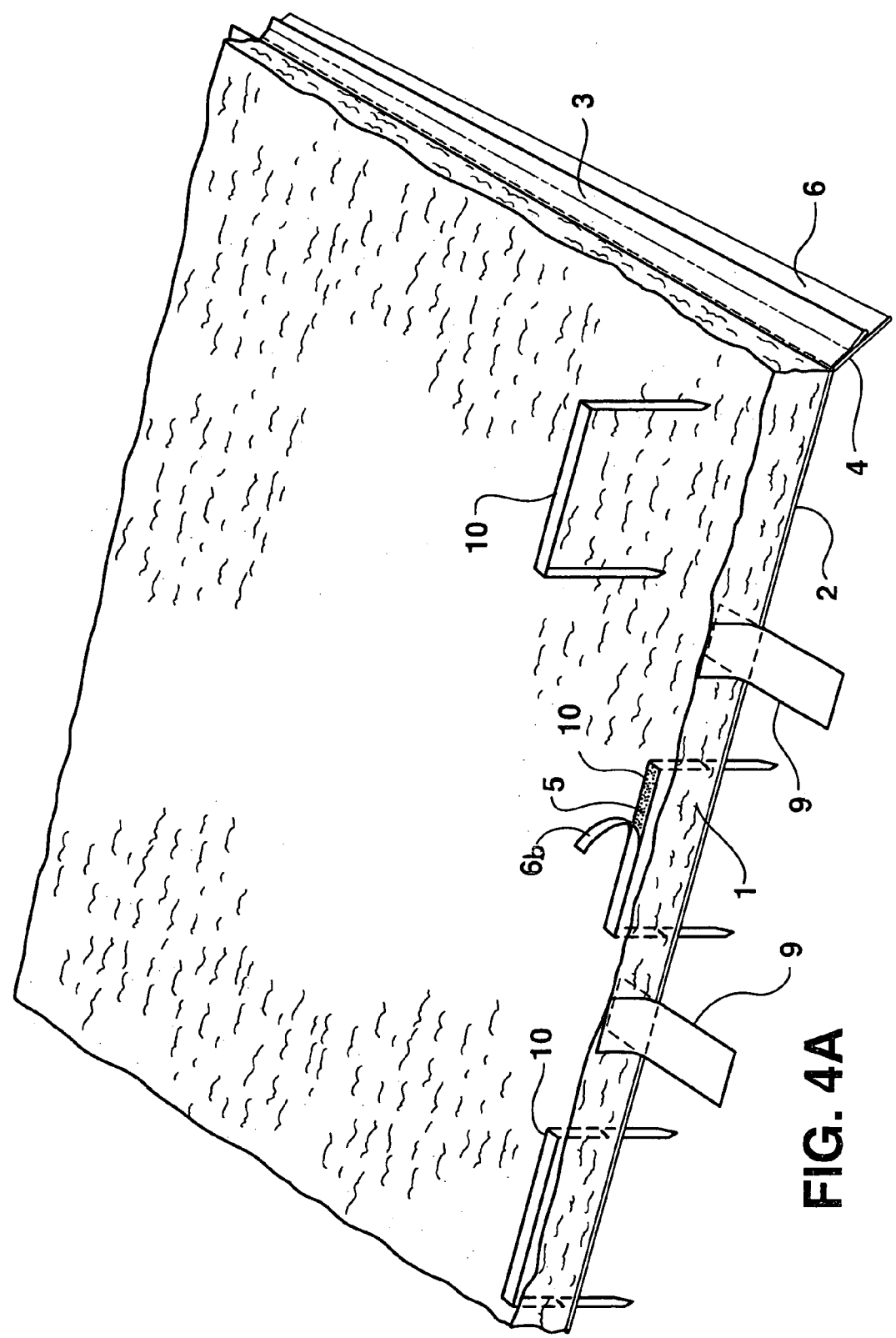
FIG. 4A is a perspective view of a piece of insulation constructed in accordance with the present invention cut from the roll of flexible fibrous blanket duct insulation having a jacket, tape consisting of an adhesive strip with split release liner strips applied to the jacket attachment flange, tabs applied to an end of the piece of insulation, and prongs applied through the end of such piece of insulation.

FIG. 4A illustrates additional steps of the prefabrication of the sheets of flexible fibrous insulation 1 with vapor-barrier jacket 2 for air conditioning duct and other fluid conduits. Anchor tabs 9 extend past the end of sheet 1 and are attached to the jacket 2. The release strips 6b are partly removed from tabs 9, and are curled away from the tabs, thereby providing a position of the release strips 6b for readily removal when the sheet of insulation 1 is applied to the air conditioning duct or other fluid conduit. Utilization of these anchor tabs 9 allows one applicator to anchor and hold in place one end of the sheet of insulation 1, enabling the same applicator to reach around the duct D and pull the other end of the sheet around the duct. In the prior art, the task of holding one end and pulling the opposite end of a piece of insulation around the duct usually requires two people one to hold the piece in place, and one to pull the opposite end of the piece up around the duct.

As shown in FIG. 4A, another step of prefabrication of the sheets of flexible fibrous insulation 1 with a vapor-barrier jacket 2 for air conditioning duct and other fluid conduits is the installation of mechanical attachment devices such as prongs 10, through the sheet of insulation 1 and jacket 2. An adhesive strip 5 is provided on the back of the foot piece of the prongs 10, and the adhesive is protected by a release strip 6b that is removed when the sheet 1 is applied to the air conditioning duct or other fluid conduit. The adhesive strip 5 on the prongs 10 provides additional anchorage of the piece of insulation 1 with vapor-barrier jacket 2 to the duct. The prong is preferably in place prior to installation of sheet 1 to allow the jacket attachment on the opposite end of the piece to be impaled over the prong, and for the prong to then be bent down over the installed attachment flange, thereby providing mechanical attachment of the two ends. In many applications utilization of these prongs 10 will eliminate the use of staple guns for this mechanical attachment. This will result in considerable savings in field applications.

Figure 4B:
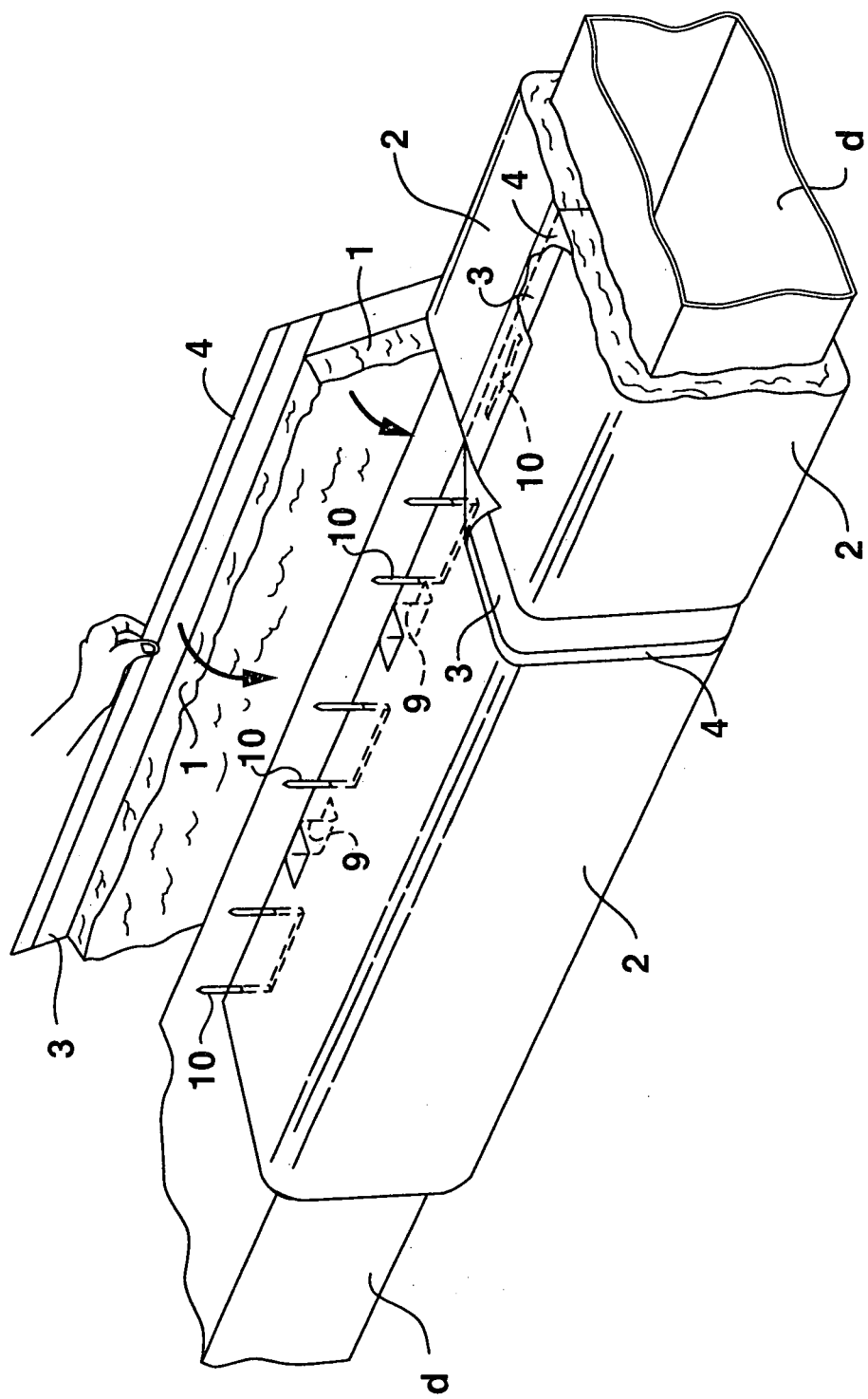
FIG. 4B is a perspective view of a piece of insulation constructed in accordance with the present invention cut from the roll of flexible fibrous blanket duct insulation having a jacket, partly applied around a duct section, such insulation having a tape applied to the jacket attachment flange, anchor tabs attached to the insulation piece and to the duct surface, and metal prongs for the mechanical attachment of the two ends of the piece together.

As shown in FIG. 4B, a prefabricated sheet of insulation 1 including jacket 2, jacket attachment flange 3, attachment tabs 9, prongs 10, and pressure sensitive adhesive tape 4 with release strips 6 has been placed partially around duct section d. The vapor barrier sheet 2, is slightly compressed down where the attachment tabs 9 are bonded to the surface of the duct d. The mechanical attachment prongs 10 are in an upright position to receive the jacket attachment flange 3 located on the opposite end of the piece of prefabricated insulation 1 with vapor-barrier sheet 2. The pressure sensitive tape 4 with release strips 6 is in place on the opposite end jacket attachment flange 3 and is in an upright position. This provides a grasp point for holding the sheet 1 in place when the jacket attachment flange 3 is impaled over the mechanical attachment prongs 10. The longitudinal jacket attachment flange 3 with pressure sensitive tape 4 with split release strip 6 is folded back for ease of application, as the piece 1 is placed snugly against any adjacent piece.

Figure 4C:
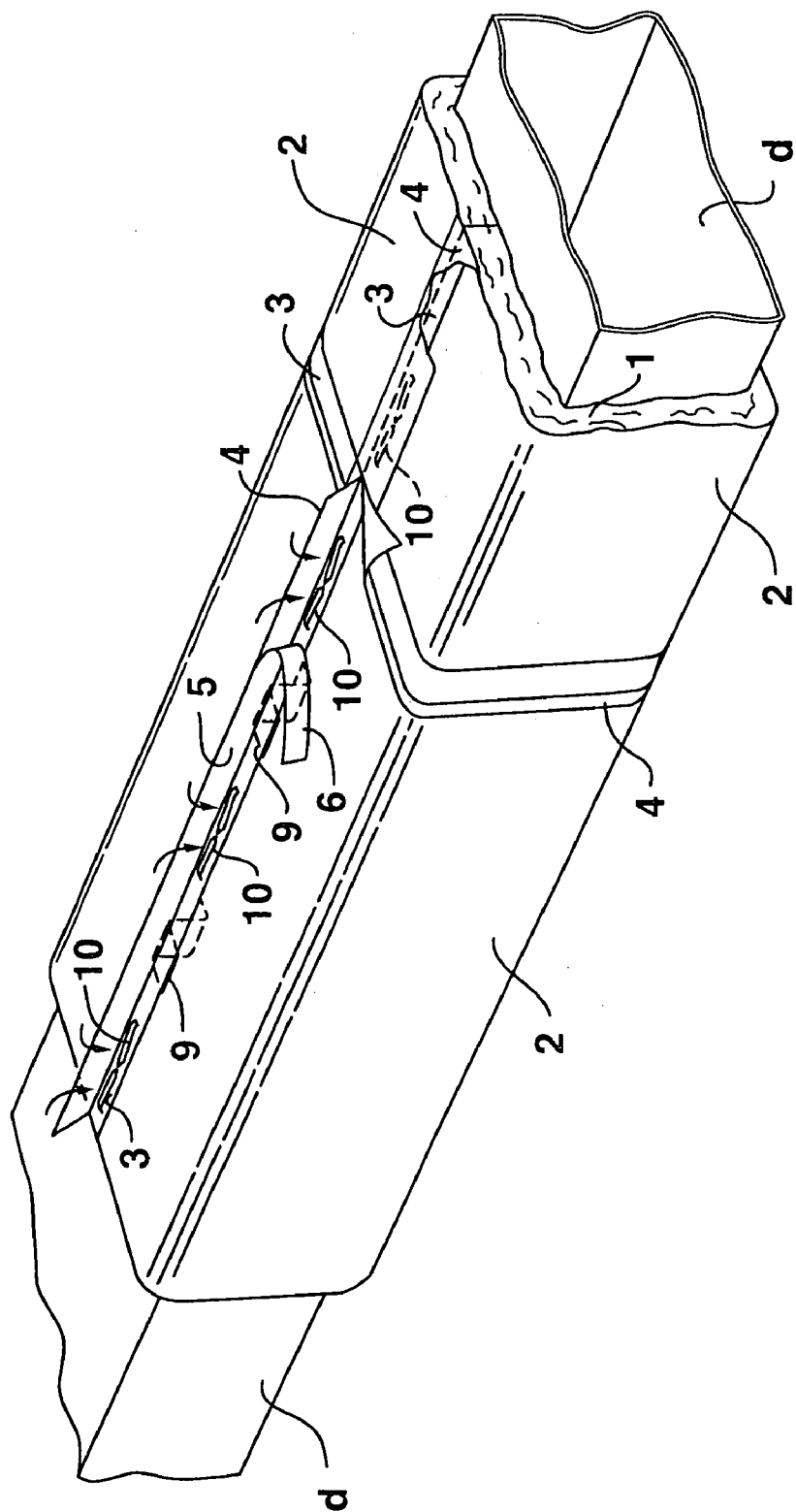
FIG. 4C is a perspective view of a piece of insulation constructed in accordance with the present invention cut from the roll of flexible fibrous blanket duct insulation with a jacket, partly applied around a duct section and abutting a piece of insulation already installed, and wherein the mechanical attachment prongs are partly laid over, and the release strip is partly off the tape.

As shown in FIG. 4C, the end of the insulation piece 1 with jacket 2 is laid down onto the duct d, and the jacket attachment flange 3 is impaled over the prongs 10. The prongs 10 are laid down onto the jacket attachment flange 3, providing mechanical attachment of the jacket flange 3. The release strip 6 is shown partly removed from the adhesive 5, and the tape 4 is in position to be laid down over the prongs 10, to thereby seal the penetrations of the prongs 10 and sealing the jacket attachment flange 3 to the jacket 2 of the opposite end of the piece of insulation.

Figure 4D:
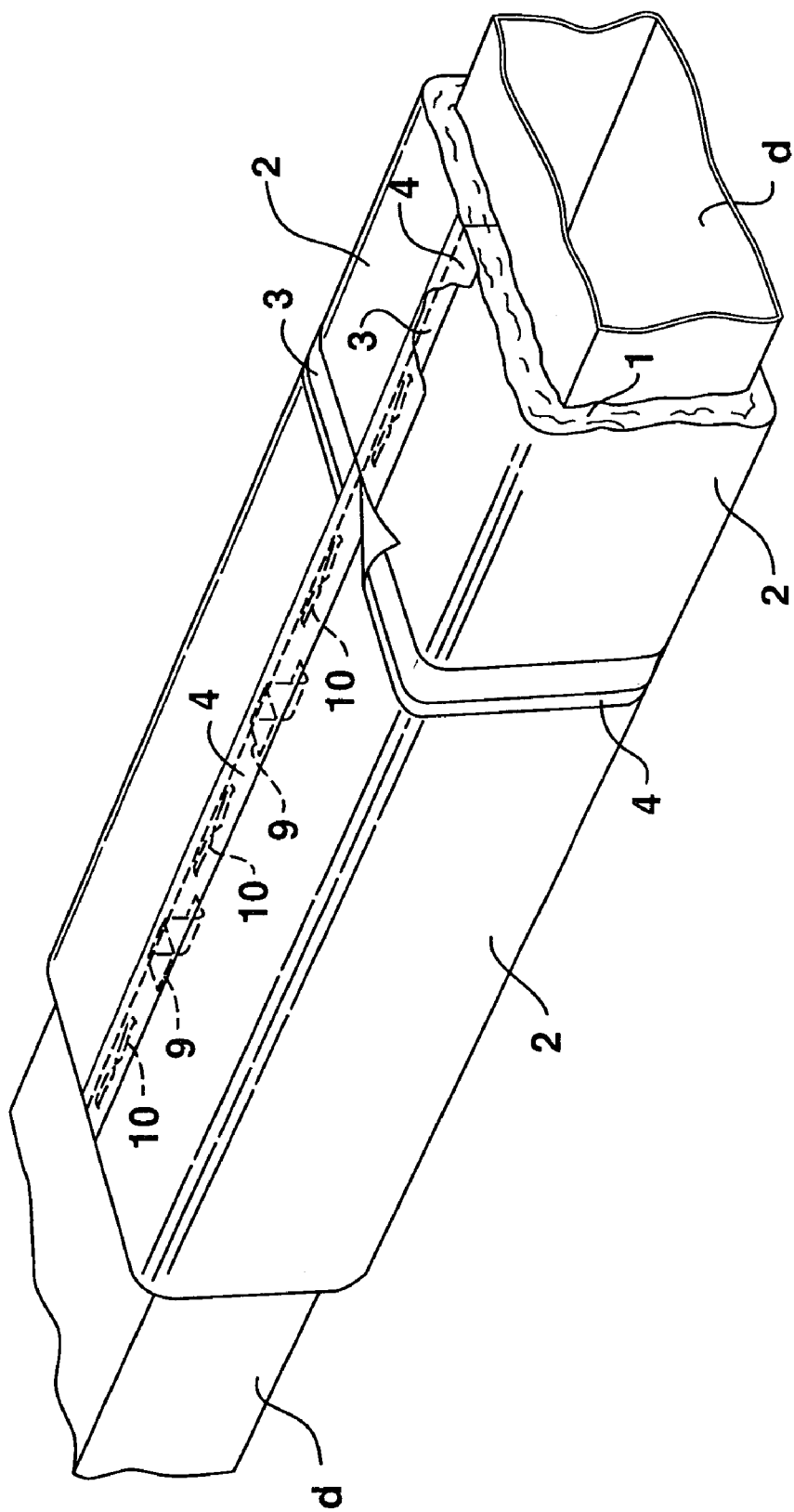
FIG. 4D is a perspective view of a piece of flexible fibrous blanket duct insulation constructed in accordance with the present invention with a jacket, partly applied around a duct section abutting the piece already installed, and wherein the longitudinal jacket flap is attached with the mechanical attachment prongs, and the tape is completely over prongs and jacket edge.

As shown in FIG. 4D, the mechanical attachment prongs 10 have been folded down to provide mechanical attachment, and the release strip 6 has been removed from the adhesive strip. The adhesive strip has been sealed down onto the vapor-barrier jacket 2, providing a complete seal over the jacket penetrations of the prongs 10 and sealing the jacket attachment flange 3 edge to the vapor barrier jacket 2 of the opposite end of the piece 1. The longitudinal jacket attachment flange 3 with pressure sensitive tape 4, having split release strip 6, is folded back for ease of application as the piece 1 is placed snugly against any adjacent piece.

Figure 5A:
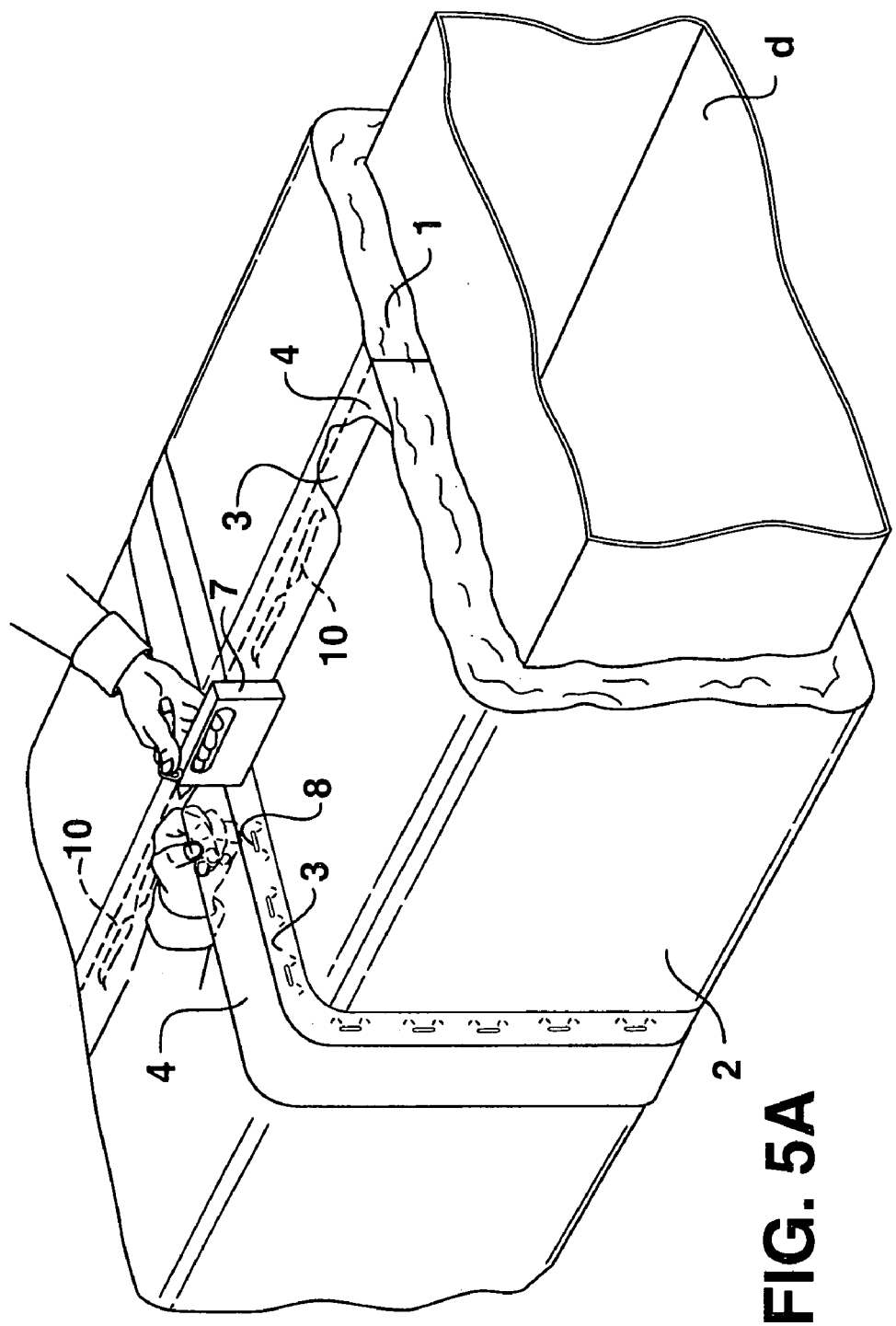
FIG. 5A is a perspective view of two abutting pieces of flexible fibrous blanket duct insulation constructed in accordance with the present invention, having a jacket partly applied around a duct section and with the circumferential jacket flap on one piece being stapled to the adjacent abutted piece.

As shown in FIG. 5A, the jacket attachment flange 3 has been pulled over the adjacent insulation piece jacket 2, and staples 8 are installed while the pressure sensitive tape 4 with split release strip 6 is held up for access of staple gun 7. The pressure sensitive tape 4 with split release strip 6 provides an excellent grasp point to insure that the insulation 1 is snug to the adjacent piece of insulation and that the jacket attachment flange 3 is completely covering the joint of the two adjacent pieces.

Figure 5B:
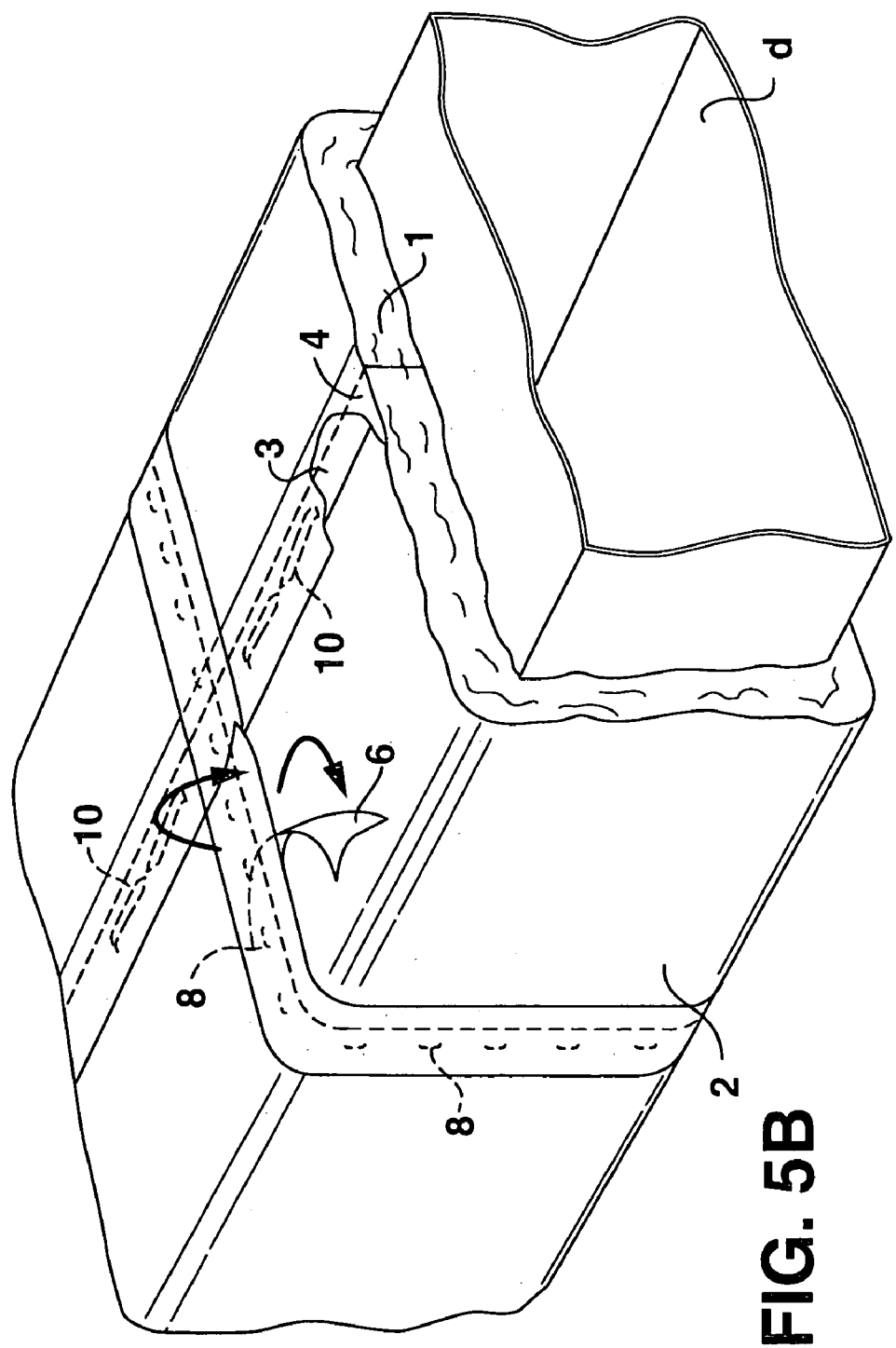
FIG. 5B is a perspective view of two abutting pieces of flexible fibrous blanket duct insulation constructed in accordance with the present invention, having a jacket partly applied around a duct section with the circumferential jacket flap being sealed over the staples and edge of the stapling flange by removing the release strip on the tape and sealing the tape to the adjacent abutted piece.

As shown in FIG. 5B, the split release strip 6 is partly removed from the pressure sensitive tape 4 that has been placed over the staples 8 and onto the adjacent jacket.

Figure 5C:
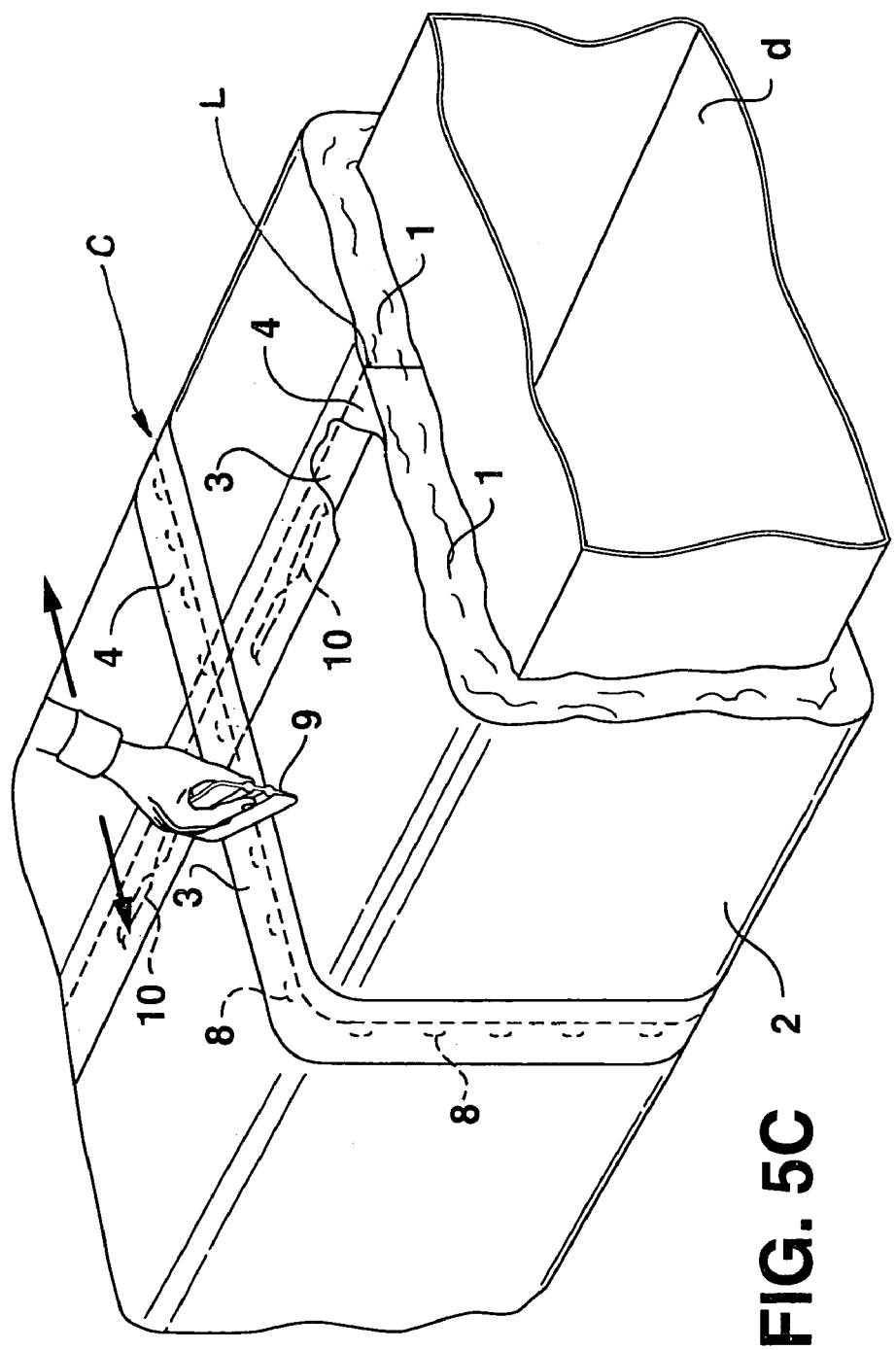
FIG. 5C is a perspective view of two abutting pieces of flexible fibrous blanket duct insulation constructed in accordance with the present invention, having a jacket applied around a duct section, and with the tape on circumferential jacket lap being sealed by rubbing briskly with a squeegee.

As shown in FIG. 5C, staples 8 have been installed completely in the circumferential joint c of two pieces, and the pressure sensitive tape 4 is smoothed and laid down by use of a squeegee 9. The same technique is used on the longitudinal joint L of two ends.

The present invention eliminates the field cutting of tape for installation on the joints of the installed pieces of insulation and reduces the time required for placement of the tape on the joints. It also provides a strong grip point on jacket during application for pulling the cut piece of insulation snug to the adjacent piece of installed insulation. It further allows final installation of tape over seams and onto adjacent jacket to be accomplished with ease.

An additional benefit of my invention is that the tape adds rigidity to the vapor-barrier jacket-flange to prevent folding or crumpling of the flange in the packaging, shipment and handling of the rolls of jacketed insulation. It also positions the jacket flange in a configuration that enhances application and ease of sealing when jacketed duct insulation is installed on duct or other surfaces.

The present invention is anticipated to result in higher quality in job site applications and should result in the job-site application time required being reduced considerably, perhaps up to 50% or more on some applications, resulting in considerable cost savings on these type applications.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. Insulation material for fluid conduits, comprising:
   a jacket, said jacket having an inner side and an outer side and a first edge;
   insulation attached to said inner side of said jacket, said jacket extending beyond said insulation and configured to form a flange having a free end generally opposite said first edge of said jacket; said flange defining an inner side and an outer side substantially opposite said inner side;
   said first edge of said jacket and said free end of said flange being configured to be generally adjacent one another upon said jacket being wrapped around the fluid conduit;
   an elongated strip of material integral with and extending substantially the length of said flange and defining a strip free end separate from said free end of said flange, said free end of said flange being configured to be independently movable with respect to said strip free end; and
   said strip of material having an adhesive portion and a removable release member covering said adhesive portion, said release member being configured to allow said adhesive portion to be selectively exposed, and said adhesive portion being configured, upon removal of said release member and upon said flange and said first end of said jacket being adjacent one another, to adhere to said outer side of said flange.

2. The insulation material as defined in claim 1, further comprising said strip of material being configured to extend beyond said free end of said flange by a predetermined distance.

3. The insulation material as defined in claim 1, further comprising said strip of material being configured to extend beyond said free end of said flange by a predetermined distance and said adhesive portion being configured, upon removal of said release member, to contact said outer side of said jacket.

4. Insulation material for fluid conduits, comprising:
   a jacket, said jacket having an inner side and an outer side and a first edge;
   insulation attached to said inner side of said jacket, said jacket extending beyond said insulation and configured to form a flange having a free end opposite said first edge; said flange defining an inner side and an outer side generally opposite said inner side;
   said first edge of said jacket and said free end of said flange being configured to be generally adjacent one another upon said jacket being wrapped around the fluid conduit;
   an elongated flap attached to said flange and extending beyond said free end of said flange for substantially the length of said flange, said flap defining a first edge and a flap free end and said free end of said flange being configured to be independently movable with respect to said flap free end; and
   said flap having an adhesive portion and a removable release member covering said adhesive portion, said release member being configured to allow said adhesive portion to be selectively exposed, and said adhesive portion being configured, upon removal of said release member and upon said flange and said first edge of said jacket being adjacent one another, to adhere to said outer side of said flange and to extend by a predetermined distance beyond said free end of said flange.

5. The insulation material as defined in claim 4, further comprising said jacket including metal prong fasteners adjacent said first edge of said jacket for engaging and securing said flange co said jacket.

6. The insulation material as defined in claim 4, further comprising:
   said jacket including fasteners adjacent said first edge of said jacket for engaging and securing said flange to said jacket; and
   wherein said adhesive portion of said flap of material is configured to cover said fasteners and adhere to said flange.

7. The insulation material as defined in claim 4, further comprising:
   said jacket including fasteners adjacent said first edge of said jacket for engaging and securing said flange to said jacket; and
   wherein said adhesive portion of said flap is configured to cover said fasteners and adhere to said jacket.

8. The insulation material as defined in claim 4, further comprising:
   fasteners in said jacket for engaging said flange, said fasteners each including a fastener adhesive portion and a removable fastener release member covering said fastener adhesive portion, said fastener release member being configured to allow said fastener adhesive portion to be selectively exposed, and said fastener adhesive portion being configured, upon removal of said fastener release member, to adhere to the fluid conduit; and
   wherein said adhesive portion of said flap is configured to cover said fasteners.

9. The insulation material as defined in claim 4, further comprising:
   at least one tab attached to and extending outwardly from said first edge of said jacket for engaging the fluid conduit, said tab including a tab adhesive portion and a removable tab release member covering said tab adhesive portion, said tab release member being configured to allow said tab adhesive portion to be selectively exposed, and said tab adhesive portion being configured, upon removal of said tab release member, to adhere to the fluid conduit.

10. The insulation material as defined in claim 4, wherein said flap is of a predetermined width and includes a first edge generally opposite said flap free end; and further comprising a flange adhesive portion extending from approximately said first edge end for approximately one third of the width of said flap and said flange adhesive portion attaching said flap to said flange, and approximately two thirds of the width of said flap being substantially free from attachment co said flange, and approximately one third of the width of said flap extending beyond said free end of said flange.

11. The insulation material as defined in claim 4, wherein:
   said flap is of a predetermined width and includes a first edge generally opposite said flap free end; and
   said adhesive portion extends from approximately said first edge for approximately one third of the width of said flap.

12. Insulation material for fluid conduits, comprising:
   a jacket, said jacket having an inner side and an outer side and a first edge;
   insulation attached to said inner side of said jacket, said jacket extending beyond said insulation and configured to form a flange having a free end opposite said first edge; said flange defining an inner side and an outer side generally opposite said inner side;

said first edge of said jacket and said free end of said flange being configured to be generally adjacent one another upon said jacket being wrapped around the fluid conduit;

an elongated flap attached to said flange and extending beyond said free end of said flange for substantially the length of said flange, said flap defining a flap free end and said free end of said flange being configured to be independently movable with respect to said flap free end;

said flap having an adhesive portion and a removable release member covering said adhesive portion, said release member being configured to allow said adhesive portion to be selectively exposed, and said adhesive portion being configured, upon removal of said release member and upon said flange and said first edge of said jacket being adjacent one another, to adhere to said outer side of said flange and to extend by a predetermined distance beyond said free end of said flange;

said jacket including fasteners adjacent said first edge of said jacket adapted for engaging and securing said flange to said jacket, upon said flange and said first end of said jacket being adjacent one another, said fasteners each including a fastener adhesive portion and a removable fastener release member covering said fastener adhesive portion, said fastener release member being configured to allow said fastener adhesive portion to be selectively exposed, and said fastener adhesive portion being configured, upon removal of said fastener release member, to adhere to the fluid conduit, and said adhesive portion of said strip of material being configured to cover said fasteners and adhere to said jacket; and at least one tab attached to and extending outwardly from said first edge of said jacket for engaging the fluid conduit, said tab including a tab adhesive portion and a removable tab release member covering said tab adhesive portion, said tab release member being configured to allow said tab adhesive portion to be selectively exposed, and said tab adhesive portion being configured, upon removal of said tab release strip, to adhere to the fluid conduit.

13. Insulation material attachable to adjacent insulation material on fluid conduits, comprising:

a jacket, said jacket having an inner side and an outer side and a first end;

insulation attached to said inner side of said jacket, said jacket extending beyond said insulation and being configured to form a flange, said flange defining a free end generally opposite said first end and an inner side and an outer side generally opposite said inner side;

said flange of said jacket being configured to extend above and over the adjacent insulation material of the fluid conduit;

said jacket including a flap extending beyond said free end of said flange, said flap defining a free end and said free end of said flange being configured to be independently movable with respect to said free end of said flap; and said flap having an adhesive portion and a removable release member covering said adhesive portion, said release member being configured to allow said adhesive portion to be selectively exposed, and said adhesive portion being configured, upon removal of said release member, to adhere to the adjacent insulation material on the fluid conduit.

14. The insulation material as defined in claim 13, further comprising said jacket including staples adjacent said first edge of said jacket for engaging said flange.

15. The insulation material as defined in claim 13, further comprising:

said jacket including fasteners adjacent said first edge of said jacket for engaging said flange; and wherein said adhesive portion of said flap is configured to cover said fasteners.

16. Insulation material attachable to adjacent insulation material on a fluid conduit, comprising:

a jacket, said jacket having an inner side and an outer side and a first edge;

insulation attached to said inner side of said jacket, said jacket extending beyond said insulation and configured to form a first flange having a free end generally opposite said first edge of said jacket and a second flange extending generally perpendicular to said first flange; said first flange and said second flange each defining an inner side and an outer side;

said second flange being configured to extend above and over the adjacent insulation material on the fluid conduit;

said first edge of said jacket and said first flange being configured to be generally adjacent one another upon said jacket being wrapped around the fluid conduit;

an elongated first flap integral with and extending substantially the length of said first flange, and a second elongated flap integral with and extending substantially the length of said second flange;

said first flap having a first adhesive portion and a removable first release member covering said first adhesive portion; said first release member being configured to allow said first adhesive portion to be selectively exposed, and said first adhesive portion being configured, upon removal of said first release member and upon said first flange and said first edge of said jacket being adjacent one another, to adhere to said outer side of said first flange; and said second flap having a second adhesive portion and a removable second release member covering said second adhesive portion, said second release member being configured to allow said second adhesive portion to be selectively exposed, and said second adhesive portion being configured, upon removal of said second release member, to adhere to the adjacent insulation material on the fluid conduit.

\* \* \* \* \*

UNITED STATES PATENT AND TRADEMARK OFFICE
CERTIFICATE OF CORRECTION

PATENT NO. : 6,935,379 B1
DATED : August 30, 2005
INVENTOR(S) : Marvin C. Buchanan, Sr.

It is certified that error appears in the above-identified patent and that said Letters Patent is hereby corrected as shown below:

Column 9,
Line 31, delete "end" and insert -- edge -- therefor.

Signed and Sealed this

Twenty-ninth Day of November, 2005

JON W. DUDAS
*Director of the United States Patent and Trademark Office*